E. BUCHHOLTZ.
FURNACE FOR ROASTING, SMELTING, OR OTHERWISE TREATING ORES.
APPLICATION FILED APR. 10, 1913.
1,100,711.  Patented June 23, 1914.
2 SHEETS—SHEET 1.
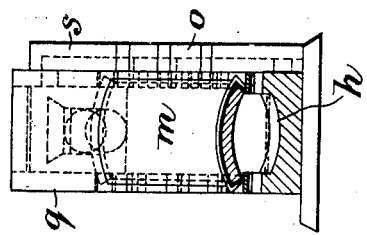
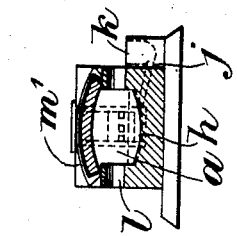
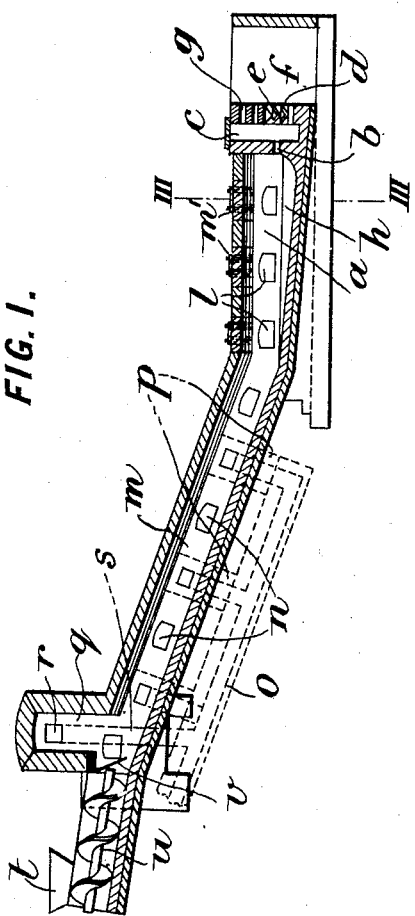
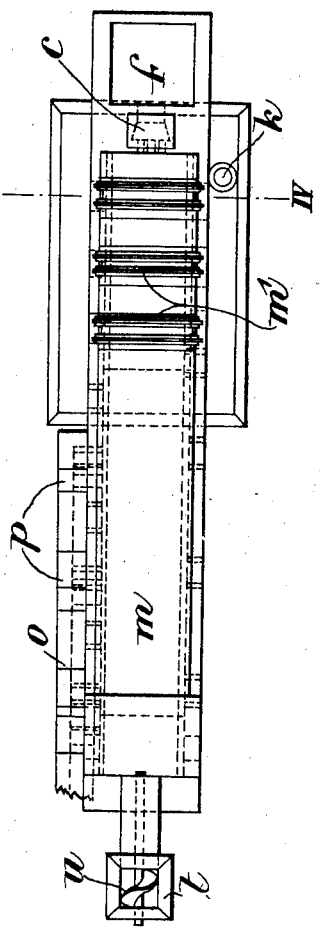

E. BUCHHOLTZ.
FURNACE FOR ROASTING, SMELTING, OR OTHERWISE TREATING ORES.
APPLICATION FILED APR. 10, 1913.
1,100,711.
Patented June 23, 1914.
2 SHEETS—SHEET 2.
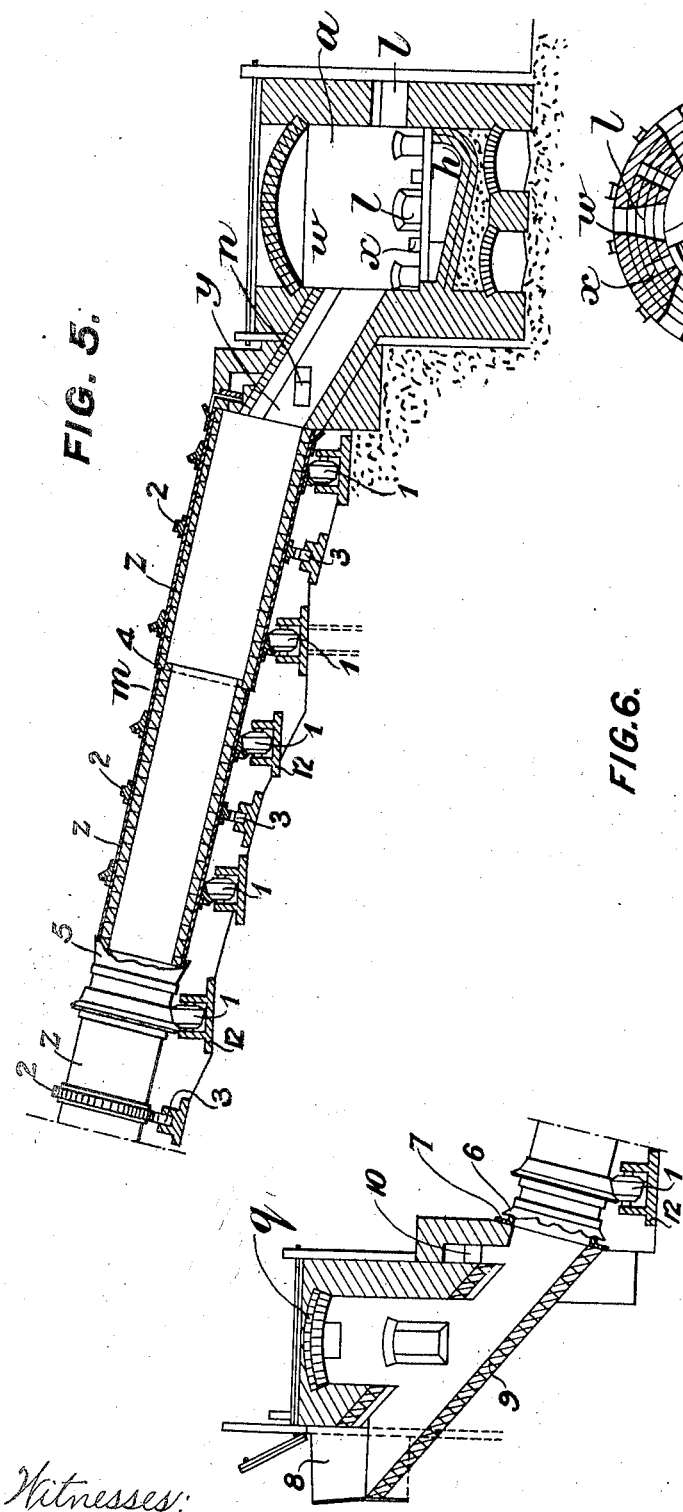
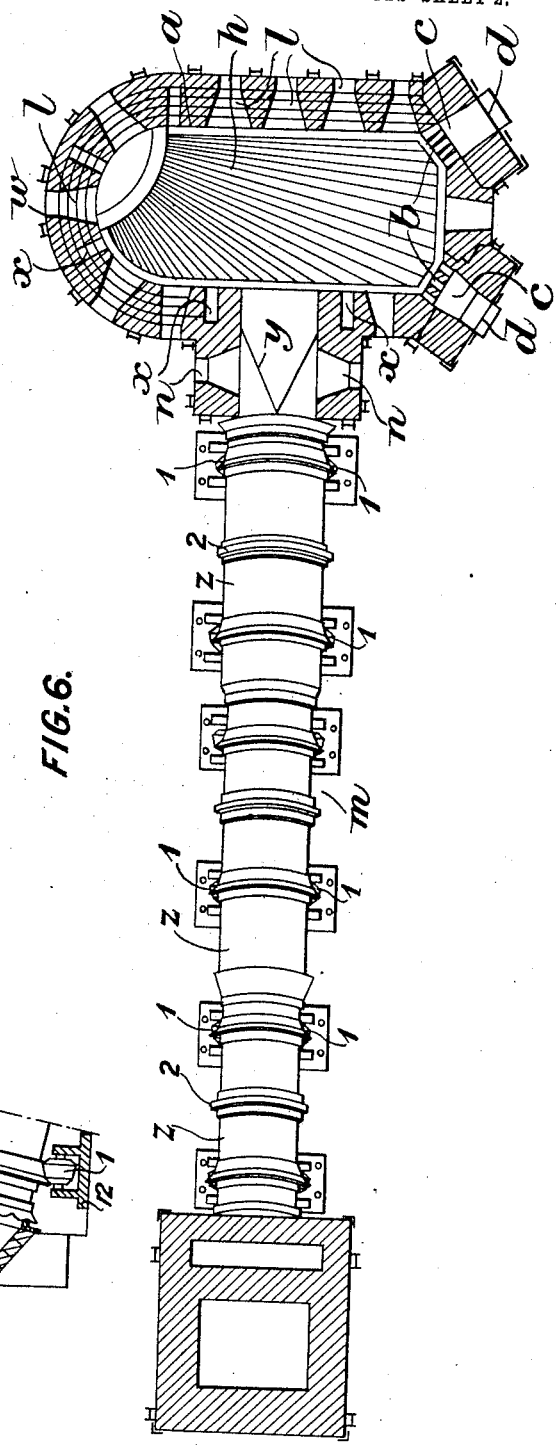

UNITED STATES PATENT OFFICE.

ERNEST BUCHHOLTZ, OF HARROW, ENGLAND, ASSIGNOR TO THE OIL-FLAME FURNACE COMPANY, LIMITED, OF HIGH HOLBORN, ENGLAND.

FURNACE FOR ROASTING, SMELTING, OR OTHERWISE TREATING ORES.

1,100,711.   Specification of Letters Patent.   Patented June 23, 1914.

Application filed April 10, 1913. Serial No. 760,157.

*To all whom it may concern:*

Be it known that I, ERNEST BUCHHOLTZ, a subject of the German Emperor, and resident of "Penlan", Marlborough Hill, Wealdstone, Harrow, in the county of Middlesex, England, have invented new and useful Improvements in Furnaces for Roasting, Smelting, or Otherwise Treating Ores, of which the following is a specification.

This invention relates to improvements in furnaces for roasting, smelting and like operations; and for otherwise treating ores.

The object of the improvements is to provide a furnace which is particularly adapted for use with liquid fuel burners and in which the temperature and other conditions are capable of being regulated exactly as desired. The preferred liquid fuel burners are of the type comprising a series of superposed open vessels or trays containing the liquid fuel such as petroleum, crude oil, petroleum refuse, tar oil and so on. The vessels of the series are spaced from one another to allow of the entry of air between them and may be supported each in a respective water bath, in order to prevent overheating of the fuel vessel and also to provide steam or water vapor for mixing with the liquid fuel vapors and air.

According to the present invention, an ore smelting furnace chamber, which is preferably oblong in plan and is in communication with the mixing chamber of the fuel burner, has an opening leading into an inclined ore roasting chamber which is placed in communication with the flue and means are provided in combination with these chambers for enabling the heat in the roasting chamber to be regulated, modulated or graduated according to the working conditions desired.

The through passages between the smelting chamber and mixing chamber are preferably arranged nearer to the floor than to the roof of the smelting chamber and the floor of the smelting chamber is preferably concaved transversely or trough-shaped and gently sloped from the rear end down to the burner end. The side walls of the smelting chamber are provided with a series of manholes or handholes fitted with doors, in order to allow of the introduction of tools or implements into the smelting chamber for the purpose of assisting or regulating the sliding of the ore down the sloping floor of the smelting chamber. The doors in the opposite walls preferably do not face one another but are arranged on the hit-and-miss principle so as to afford a greater range of control.

The roasting chamber or flue into which the rear end of the smelting chamber opens is inclined upwardly from the end of the smelting chamber at an angle of, say, 20 to 25 degrees and a dome or hood is provided over an opening at the highest point of the roasting chamber, for the collection of fumes, for example sulfurous fumes or gases, which may be led away to a suitable condenser or deposit chamber, or may be otherwise suitably dealt with. Manholes or handholes fitted with doors are provided in the side walls of the roasting chamber when the latter is a fixed structure of, for example, brickwork or masonry, the arrangement of such holes being similar to that described with reference to the smelting chamber, and in one side wall of the roasting chamber openings are formed communicating with branch flues leading into a main flue, the latter leading the waste gases and products of combustion into a dust collecting or recovering chamber or directly to a chimney. If desired, of course, these openings and branch flues might be arranged on both sides of the roasting chamber. Doors or dampers are fitted in the branch flues so that any number of the latter may be shut off, thereby enabling the temperature at various points of the roasting chamber to be regulated as desired. In some cases, however, the roasting chamber is constructed wholly or partly as an inclined revolving drum, and it is then advantageous to have the last few feet of the roasting chamber sloping downwardly toward the smelting chamber at a much steeper angle. This steep portion of the roasting chamber may be built in the brickwork or other fabric of the smelting chamber and need not be revoluble. In this modification the smelting chamber is conveniently arranged at right angles to the axis or length of the roasting chamber and flues and dampers or valves may be provided to allow some of the heat to escape from the smelting chamber so that the whole of the heat does not enter the roasting zone, the temperature in the latter being thereby capable of regulation as desired and to suit various working conditions. The heat in the roasting chamber can therefore be very nicely modulated or controlled and, owing to the revolution of the roasting chamber, sticking of the material to the walls of the roasting chamber is avoided.

In order to enable this invention to be readily understood, examples of the two constructions above referred to will be hereinafter more particularly described with reference to the accompanying drawings throughout which similar reference characters have been employed to indicate similar or corresponding parts.

Figure 1 is a longitudinal vertical section of a combined furnace and roasting chamber constructed according to these improvements, the roasting chamber being of the fixed or non-revoluble variety. Fig. 2 is a plan of Fig. 1. Fig. 3 is partly a front elevation and partly a transverse section upon the line III—III of Fig. 1. Fig. 4 is a transverse section upon the line IV—IV of Fig. 2. Fig. 5 is a longitudinal section, partly in side elevation of a modified construction in which the roasting chamber comprises inclined revoluble cylinders or drums, and, Fig. 6 is a plan showing parts in horizontal sections, the sections being taken along irregular lines, as will be apparent by comparing Figs. 5 and 6, for the sake of clearness.

Referring to Figs. 1 to 4, $a$ is the smelting chamber which is in communication through the passages or nozzles $b$ with the so-called mixing chamber $c$ of the burner $d$. The latter preferably consists of a number of superposed trays situated in a passage or passages $e$ leading into the chamber $c$ and containing liquid fuel as aforesaid, and the actual construction of this burner device forms no part of the present invention. The front of the chamber $c$ may be guarded by a well $f$, which allows air to pass into the passages $e$ but obstructs the approach to the burner $d$. Additional air inlets $g$ may be provided in the front wall of the chamber $c$ above the burner $d$, and such inlets may be fitted with valves or dampers, not shown, for regulating the quantity of additional air which is admitted to the chamber $c$.

The nozzles $b$ are situated preferably nearer to the bottom of the chamber $c$ than the top and a little above the highest point on the surface of the sloping hearth or bed $h$. The hearth $h$ is preferably concave or trough-shaped in cross section and slopes downwardly toward the mixing chamber $c$. At the lowest point of the hearth $h$ there may be an exit into a siphon or U-bend $j$ communicating with a metal pot or receiver $k$, which arrangement is particularly suitable when smelting lead from lead ores.

The side walls of the smelting chamber $a$ are formed with manholes or handholes $l$ which are covered or closed by suitable doors, or the like, not shown in the drawing. These apertures permit of the introduction of tools or implements for operating upon the charge of material upon the hearth. The roof of the smelting chamber may comprise removable sections $m^1$ to allow of cleaning or repairing operations being carried out in the chamber $a$ when necessary.

In the construction shown, the open end of the smelting chamber $a$ communicates with an inclined roasting chamber $m$ of the same width as, and inclined upwardly from, the smelting chamber $a$ a suitable angle being say, 20 to 25 degrees from the horizontal. The side walls of this chamber $m$ are formed with apertures $n$, and it is preferred to arrange each aperture in one side wall at a point opposite a point midway between two neighboring apertures in the opposite side wall, as will be understood by reference to Fig. 2.

A flue $o$ is provided preferably at one side of the roasting chamber $m$ and into this flue branch flues $p$ are led, the branch flues $p$ communicating with the roasting chamber at suitable points and being fitted with suitable dampers or valves, not shown, for regulating or shutting off the flow of hot gases, fumes and products of combustion through any branch flue $p$ as may be desired. By adjusting the various dampers or valves, the temperature in the roasting chamber $m$ is capable of being graduated, so that at different points along the chamber $m$ there may be maintained different temperatures suited to the conditions which it may be desirable for the material undergoing treatment to have at those points.

At the upper end of the roasting chamber there is a dome or hood $q$ in which fumes or gases may be collected as aforesaid. Such fumes may be led away from the hood $q$ to a condenser or deposit chamber, or may be otherwise suitably dealt with. For example, there may be an opening $r$ in the hood communicating by a branch $s$ with the flue $o$ which may lead to a condenser or deposit chamber as aforesaid. If preferred, however, the branch flue $s$ may lead into any other suitable duct.

The ore is preferably fed into a hopper $t$ and delivered from the latter to the upper end of the roasting chamber conveniently by means of a worm conveyer $u$, a flap valve or self-closing hinged door $v$ being suitably fitted over the feed opening at the upper end of the roasting chamber $m$, so that the latter will be closed and the escape of hot air and gases prevented, whenever the conveyer $u$ ceases to supply ores to the roasting chamber $m$.

In operation the combustion is conducted so that the highest temperatures are produced in the smelting chamber $a$ and at the most advantageous point in the latter. The flame from the liquid fuel burner $d$ is drawn through the smelting chamber $a$ over the ore contained therein and undergoing the process of reduction and smelting. The flame and hot gases then pass up the sloping roasting chamber $m$ and roast the fresh ores which are being fed through such chamber. The gases and products of combustion escape by any one or more of the branch flues $p$, the position and number of the flues open to the roasting chamber being controlled by the dampers in accordance with the temperature required at the various parts of the roasting chamber.

According to the modified construction illustrated in Figs. 5 and 6 the smelting chamber $a$ is approximately of oblong shape, one short side being replaced with advantage by a semicircle or curve $w$ so as to deflect the flames and gases which are directed toward such curved wall by the nozzles $b$ leading from the mixing chambers $c$ of the burners $d$, situated at the angles of the opposite end of the chamber $a$, thereby causing such flames and gases to sweep around the walls and providing a uniform degree of heating all over the chamber $a$. The floor or hearth $h$ may slope downward from the rear to the front and also, in addition, from the burner end toward the curved end $w$ of the chamber $a$. Suitable manholes and handholes $l$ are provided in the walls for the insertion of implements employed in smelting processes and flue openings $x$ are provided preferably at, or near to, the curved end $w$ of the chamber and near to the orifice of the roasting chamber so that, by suitably regulating such flue openings, the amount of heat passing into the inclined roasting chamber can be varied as desired.

A steep portion $y$ of the roasting chamber $m$ or tunnel may open into the smelting chamber $a$ midway along one of the long sides thereof, and the walls of such steep portion may be formed with hand-holes $n$.

The various hand-holes may be narrow at the outside and may open out inwardly to allow of the necessary movements of the tools.

The roasting chamber $m$ instead of being fixedly constructed and wholly of brickwork may comprise three cylinders or drums $z$ each of which is mounted on suitable rollers 1 or bearings and is provided with a toothed ring 2 or the like, so that the cylinders may be driven at different speeds if desired. For example, reciprocating racks 3 may mesh with the toothed rings 2 for oscillating the cylinders or drums $z$. The cylinder nearest the smelting chamber $a$ may have the greatest diameter and the intermediate cylinder may have its lower end reduced, as at 4, so as to take into and make joint with the cylinder of greatest diameter. The third cylinder from the smelting chamber $a$ may have a flared lower end 5 taking over the upper end of the intermediate cylinder and may also have a flared upper end 6 taking over a tubular outlet 7 from a charging hopper 8.

A combined charging hopper 8 and chute 9 is conveniently built of brickwork, and a dome or draw-off hood $q$ for the abstraction of gases and fumes is built over the chute 9, and in front of the dome or hood $q$ there may be a flue space 10 formed in the brickwork and fitted with a damper which can be suitably regulated.

The cylinders $z$ constituting the roasting chambers may be fitted with circumferential thrust rings 11 in suitable positions and the supporting rollers 1 upon which the cylinders $z$ turn may have rear bearing faces for receiving the thrust of the rings 11 aforesaid due to the endwise tendency of the cylinders $z$ whose axes are at an angle to the horizontal. Of course roller or ball bearing devices may be fitted where desired for the purpose of reducing frictional resistance to movement of the drums.

I claim—

1. A roasting and smelting liquid fuel furnace, comprising a mixing chamber for fuel and air, a smelting chamber in communication with said mixing chamber through nozzle-like passages, a roasting chamber inclining upwardly away from said smelting chamber and communicating with the latter, flues leading from a plurality of points in said furnace, and dampers in said flues for regulating the escape of hot gases after the latter have been effective in the smelting chamber, whereby the temperature in the roasting chamber may be adjusted to suit the material being roasted.

2. A roasting and smelting liquid fuel furnace, comprising a mixing chamber for fuel and air, a smelting chamber in communication with said mixing chamber through nozzle-like passages, a roasting chamber inclining upwardly away from said smelting chamber and communicating with the latter, a hood arranged over the upper open end of said roasting chamber, draw-off means connected with said hood, flues leading from a plurality of points in said furnace, and dampers in said flues for regulating the escape of hot gases after the latter have been effective in the smelting chamber, whereby the temperature in the roasting chamber may be adjusted to suit the material being roasted.

3. A roasting and smelting liquid fuel furnace, comprising a smelting chamber, a liquid fuel burner arrangement to deliver a heating flame into said smelting chamber, an inclined roasting tunnel leading from said smelting chamber, an inclined cylinder communicating with said tunnel, means for revolubly supporting said cylinder, driving means for said cylinder, feeding means to deliver material to be roasted into the upper end of said cylinder, flues leading from a number of points in the walls of said smelting chamber and dampers in said flues for regulating the escape of hot gases, whereby the volume of hot gases passed through the roasting tunnel may be adjusted to suit the material being roasted, substantially as set forth.

4. A roasting and smelting liquid fuel furnace, comprising a smelting chamber, a liquid fuel burner arrangement adapted to deliver a heating flame into said smelting chamber, an inclined roasting tunnel having a comparatively steep gradient and opening at its lower end into said smelting chamber, a revoluble cylinder, revoluble means rotatably supporting said cylinder at an angle of inclination which is not so great as that of the tunnel aforesaid, said cylinder communicating with said tunnel, driving means geared with said cylinder and adapted to turn said cylinder about its longitudinal axis, feeding means adapted to deliver material to be roasted into the upper end of said cylinder, flues leading from a number of points in the walls of said smelting chamber and dampers in said flues for regulating the escape of hot gases, whereby the volume of hot gases passed through the roasting tunnel may be adjusted to suit the material being roasted, substantially as set forth.

5. A roasting and smelting liquid fuel furnace, comprising a smelting chamber having a greater length than breadth and constructed with regulatable flue openings, liquid fuel burners arranged at one end of said chamber to deliver a heating flame into said chamber, a curved wall at the other end of said chamber, an inclined tunnel leading from one side of said smelting chamber, an inclined revoluble cylinder communicating at its lower end with said tunnel, and feeding means at the upper end of said cylinder for introducing material to be treated into the upper end of said cylinder.

ERNEST BUCHHOLTZ.

Witnesses:
O. J. WORTH,
C. P. LIDDON.